US008255766B2

United States Patent
Hwang et al.

(10) Patent No.: US 8,255,766 B2
(45) Date of Patent: Aug. 28, 2012

(54) RECEIVING APPARATUS AND METHOD FOR INTERFERENCE CANCELLATION IN A WIRELESS COMMUNICATION SYSTEM

(75) Inventors: Keun-Chul Hwang, Seongnam-si (KR); Sung-Woo Park, Suwon-si (KR); June Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1273 days.

(21) Appl. No.: 12/006,740

(22) Filed: Jan. 4, 2008

(65) Prior Publication Data
US 2008/0168326 A1   Jul. 10, 2008

(30) Foreign Application Priority Data
Jan. 4, 2007   (KR) .................. 10-2007-0000905

(51) Int. Cl.
*H03M 13/00* (2006.01)
*H03M 13/03* (2006.01)
*H04B 1/00* (2006.01)
(52) U.S. Cl. ......... 714/758; 714/781; 714/791; 375/144
(58) Field of Classification Search .................. None
See application file for complete search history.

(56) References Cited

U.S. PATENT DOCUMENTS

| | | | |
|---|---|---|---|
| 2003/0076908 A1* | 4/2003 | Huang et al. | 375/350 |
| 2005/0089112 A1* | 4/2005 | Piechocki et al. | 375/267 |
| 2005/0094742 A1* | 5/2005 | Yee | 375/267 |
| 2005/0111592 A1* | 5/2005 | Yee | 375/341 |
| 2005/0135498 A1* | 6/2005 | Yee | 375/267 |
| 2007/0118786 A1* | 5/2007 | Lim et al. | 714/751 |
| 2007/0150797 A1* | 6/2007 | Hwang et al. | 714/781 |
| 2007/0250555 A1* | 10/2007 | Piechocki et al. | 708/300 |
| 2007/0286313 A1* | 12/2007 | Nikopour-Deilami et al. | 375/341 |

FOREIGN PATENT DOCUMENTS
KR   1020060102050 A   9/2006
* cited by examiner

*Primary Examiner* — Ajay Bhatia
*Assistant Examiner* — Daniel McMahon

(57) ABSTRACT

A receiving apparatus and a receiving method for interference cancellation in a wireless communication system are provided. The receiving apparatus includes a multiple-input, multiple-output (MIMO) detector for estimating a desired signal and an interference signal based on received signals in accordance with a MIMO detection scheme; a first decoder for iteratively decoding the interference signal output from the detector; a second decoder for iteratively decoding the desired signal output from the decoder; and an LLR updater for updating an interval LLR value of the second decoder using an interval LLR value of the first decoder.

16 Claims, 4 Drawing Sheets

RECEIVING APPARATUS AND METHOD FOR INTERFERENCE CANCELLATION IN A WIRELESS COMMUNICATION SYSTEM

CROSS-REFERENCE TO RELATED APPLICATION(S) AND CLAIM OF PRIORITY

This application claims priority under 35 U.S.C. §119(a) to an application filed in the Korean Intellectual Property Office on Jan. 4, 2007 and assigned Serial No. 2007-0000905, the disclosure of which is herein incorporated by reference.

TECHNICAL FIELD OF THE INVENTION

The present invention relates generally to a receiving apparatus and a method in a wireless communication system. More particularly, the present invention relates to an apparatus and a method for reducing a processing latency of an interference cancellation scheme at a receiver.

BACKGROUND OF THE INVENTION

Interference is a factor as important as noise in a wireless communication environment. For example, interference from a neighbor cell in a cell boundary, interference from other users concurrently accessing the same frequency band in the same cell, and interference between different data streams when a multiple-input, multiple-output (MIMO) system sends multiple data to a single user not only deteriorate a reception performance of a receiver but also degrade a system capacity.

There are two major methods for the efficient interference cancellation.

One method is a linear interference cancellation such as Minimum Mean Square Error (MMSE) and Zero Forcing (ZF). The linear interference cancellation features the low complexity by linearly canceling the interference by multiplying the received signal by an adequate weight.

Another method is a non-linear interference cancellation such as Serial Interference Cancellation (SIC) and Parallel Interference Cancellation (PIC). The non-linear interference cancellation detects a signal without considering the interference, regenerates the interference signal using the detected signal and a channel coefficient, removes the regenerated interference signal from the received signal, and then redetects the signal. Compared to the linear interference cancellation, the non-linear interference cancellation has the high complexity and the better performance. In specific situations, it is known that the non-linear interference cancellation is optimal in terms of information theory.

The non-linear interference cancellation is divided to two methods based on how to regenerate the interference signal.

One method regenerates the interference using a signal passing through only a detector, and the other method regenerates the interference using a signal passing through up to a decoder. While the latter method can regenerate the more accurate interference signal, its latency is increased.

Typically, a Forward Error Correction (FEC) coding scheme is used as the alternative method to raise reliability of a radio channel. A transmitter sends information data by adding redundancy using a FEC code, and a receiver corrects error merely with the received data. The more amount of the redundancy information, the more amount of the correctable error. Instead, the amount of data transmittable using the same resource is reduced.

Currently, a turbo code and a Low Density Parity Check (LDPC) code, which are known as among the best FEC codes, employ an iterative decoder in the receiver. To decode two codes generated by two encoders, the turbo coding iteratively exchanges respective information and the LDPC coding iteratively exchanges information between a variable node and a check node, to thus maximize the error-correction capability. As the number of the iterations increases, the latency and the complexity increase but the error correction capability is enhanced.

FIG. 1 illustrates a conventional receiver structure using the SIC.

The receiver of FIG. 1 includes a MIMO detector 100, a decoder 102, a hard decision part 104, an interference signal generator 106, a subtracter 108, a MIMO detector 110, a decoder 112, and a hard decision part 114. Hereafter, it is assumed that $x_1$ is an interference signal and $x_2$ is a desired signal to receive.

The MIMO detector 100 outputs an estimated interference signal $\hat{x}_1$ by demodulating a received signal, y, received on a plurality of antennas according to a predetermined MIMO detection scheme. The decoder 102 decodes the estimated interference signal output from the MIMO detector 100 using a certain demodulation scheme. The hard decision part 104 outputs decoded data by hard-deciding soft values output from the decoder 102, while the soft values are information bits, each with an estimated degree of certainty.

The interference signal generator 106 generates an interference signal $h_1 \tilde{x}_1$ with the decoded data output from the hard decision part 104 and channel information. The subtracter 108 removes the interference signal of the interference signal generator 106 from the received signal y.

The MIMO detector 110 outputs an estimated desired signal $\hat{x}_2$ by demodulating the interference-free signal output from the subtracter 108 using a certain MIMO detection scheme. The decoder 112 decodes the estimated desired signal fed from the MIMO detector 110 using a certain decoding scheme. The hard decision part 104 outputs decoded data $\tilde{x}_2$ by hard-deciding soft values from the decoder 112.

As discussed above, according to the non-linear interference cancellation, the performance with the decoding process is better than the performance without the decoding process. However, since it takes a considerable time to generate the interference signal as shown in FIG. 1, the latency is likely to increase until the desired signal is decoded. Particularly, when the iterative decoding is used as in the turbo coding or the LDPC coding, the latency is deteriorated to thus degrade the entire system performance.

SUMMARY OF THE INVENTION

To address the above-discussed deficiencies of the prior art, it is a primary aspect of the present invention to substantially solve at least the above problems and/or disadvantages and to provide at least the advantages below. Accordingly, an aspect of the present invention is to provide an apparatus and a method for reducing a processing latency of an interference cancellation at a receiver.

Another aspect of the present invention is to provide an apparatus and a method for using Log Likelihood Ratios (LLRs) of an interference signal to decode a desired signal at a receiver.

Yet another aspect of the present invention is to provide an apparatus and a method for updating an LLR of a desired signal using an LLR of an interference signal at a receiver.

The above aspects are achieved by providing a receiving apparatus in a wireless communication system. The receiving apparatus includes a detector for estimating a desired signal and an interference signal by multiple-input, multiple-output (MIMO)-detecting received signals; a first decoder for iteratively decoding the interference signal output from the detector; a second decoder for iteratively decoding the desired signal output from the decoder; and an LLR updater for updating an internal LLR value of the second decoder using an internal LLR value of the first decoder.

According to one aspect of the present invention, a receiving apparatus in a wireless communication system includes a detector for estimating at least two streams by MIMO detecting received signals; decoders for iteratively decoding the corresponding streams output from the detector, the decoders detecting a sign-inverted LLR during the iterative decoding; and an LLR updater for, when the sign-inverted LLR is detected from one of the decoders, updating internal LLR values of the other decoders.

According to another aspect of the present invention, a receiving method in a wireless communication system includes estimating a desired signal and an interference signal by MIMO-detecting received signals; iteratively decoding the interference signal and the desired signal respectively; and updating an LLR value generated during the iterative decoding of the desired signal using an LLR value generated during the iterative decoding of the interference signal.

According to yet another aspect of the present invention, a receiving method in a wireless communication system includes estimating at least two streams by MIMO-detecting received signals; iteratively decoding the estimated streams respectively; detecting a sign-inverted LLR during the iterative decoding; and updating, when the sign-inverted LLR is detected, corresponding LLR of the other streams being iteratively decoded.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
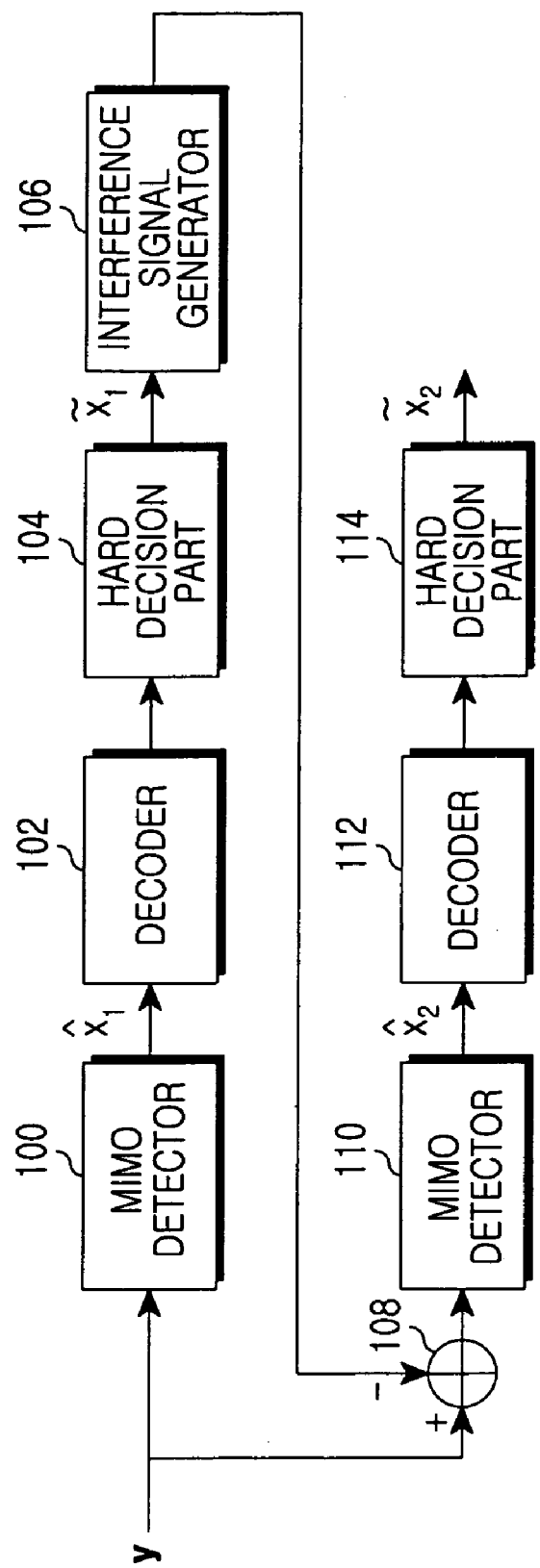
FIG. 1 illustrates a conventional receiver structure using a SIC.
Figure 2:
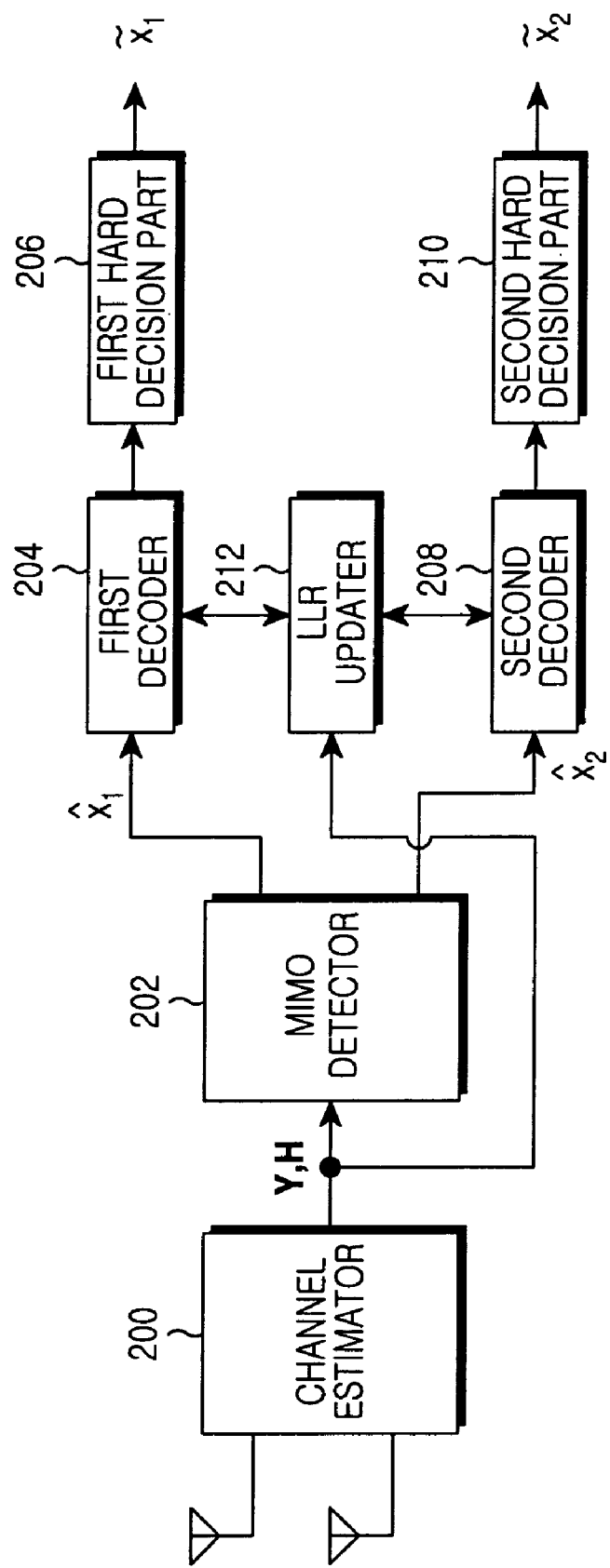
FIG. 2 illustrates a receiver structure in a wireless communication system according to an embodiment of the present invention.
Figure 3:
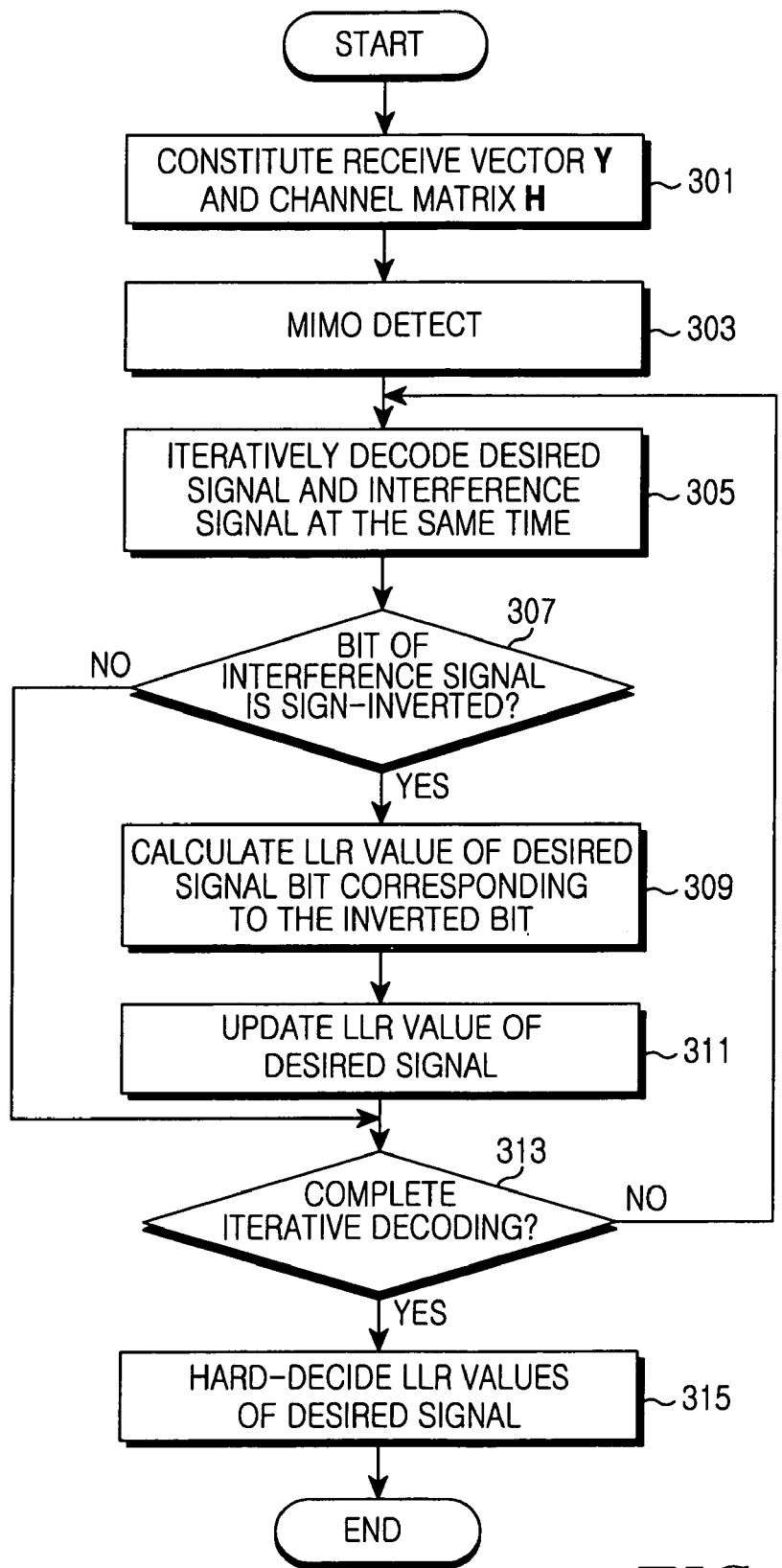
FIG. 3 illustrates operations of the receiver to perform a SIC according to an embodiment of the present invention.
Figure 4:
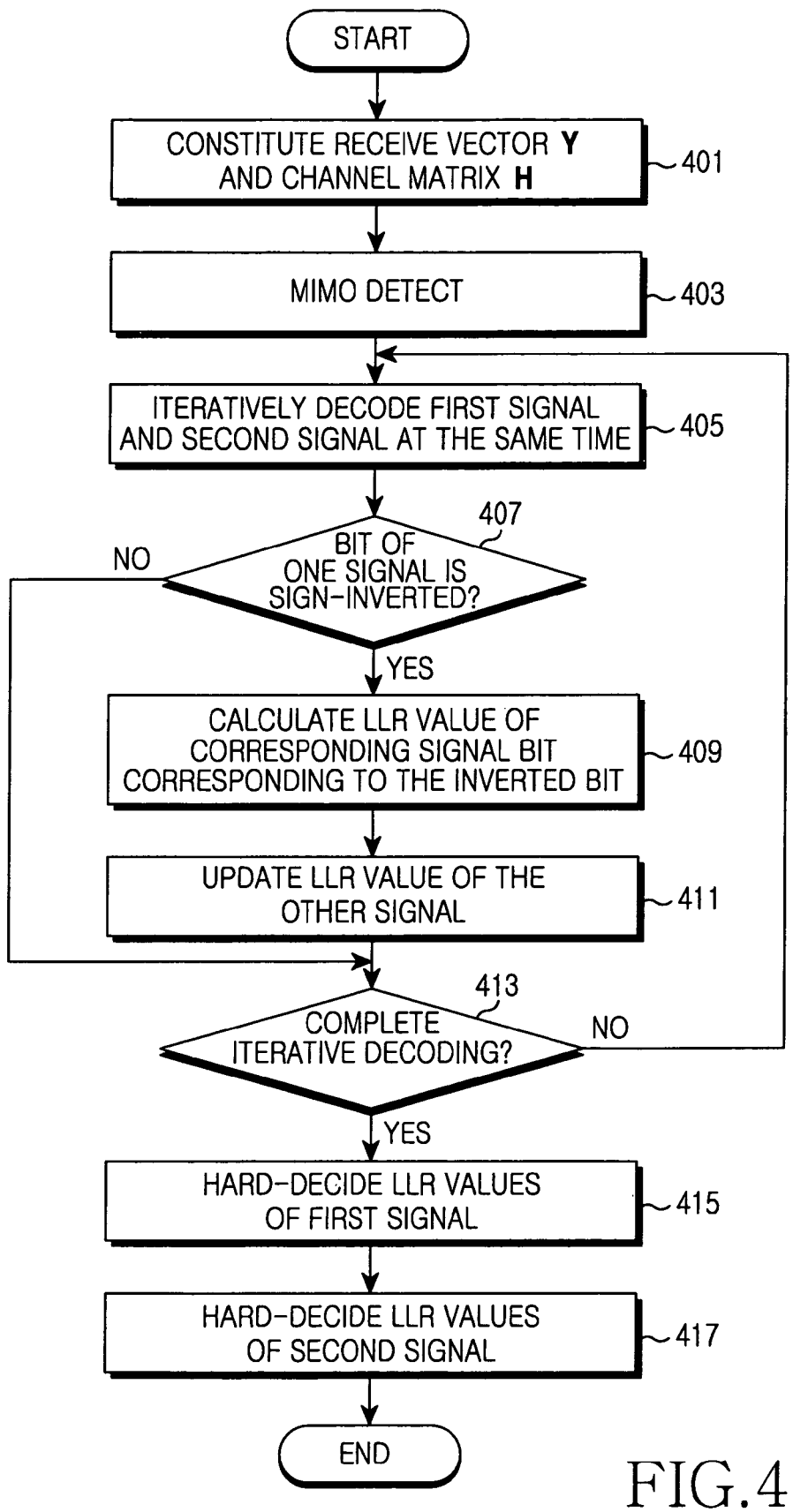
FIG. 4 illustrates operations of a receiver to perform a PIC according to another embodiment of the present invention.

FIGS. 2 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a method for reducing a processing latency of an interference cancellation at a receiver using an iterative decoding. Particularly, the present invention provides a method for updating a Log Likelihood Ratio (LLR) of a desired signal using an LLR of an interference signal during the decoding at a receiver.

To ease the understanding of the present invention, it is assumed that the receiver uses two antennas and there are two transmit signals. In this case, the signal can be modeled as expressed as Equation 1:

$$y = Hx + n = [h_1 \ h_2 ] \begin{bmatrix} x_1 \\ x_2 \end{bmatrix} + n = h_1 x_1 + h_2 x_2 + n \quad [\text{Eqn. 1}]$$

In Equation 1, y is a 2×1 receive signal vector, n is a 2×1 noise vector, H=[$h_1$ $h_2$] is a 2×2 channel matrix, and $$x = \begin{bmatrix} x_1 \\ x_2 \end{bmatrix}$$

is a 2×1 transmit signal. If Equation 1 models a case where a signal $x_2$ of a neighbor cell acts as the interference in a cell boundary, $x_2$ is eliminated through the interference cancellation and then $x_1$ is detected. If Equation 1 models a case where a signal $x_2$ of a neighbor sector acts as the interference in a multi-sector system, $x_2$ is eliminated through the interference cancellation and then $x_1$ is detected. If Equation 1 models a Multi-User Detection (MUD) or a Spatial Multiplexing (SM), $x_1$ is detected by regarding $x_2$ as the interference and $x_2$ is detected by regarding $x_1$ as the interference.

Hereafter, it is assumed that $x_1$ is the interference signal and $x_2$ is the desired signal to receive.

FIG. 2 illustrates a receiver structure in a wireless communication system according to an embodiment of the present invention.

The receiver of FIG. 2 includes a channel estimator 200, a MIMO detector 202, a first decoder 204, a first hard decision part 206, a second decoder 208, a second hard decision part 210, and an LLR updater 212.

The channel estimator 200 constructs a receive vector y with signals received on a plurality of antennas and constructs a channel matrix H by estimating a channel using a received specific signal (e.g., pilot signal). The channel estimator 200 provides the receive vector and the channel matrix to the MIMO detector 202 and the LLR updater 212.

The MIMO detector 202 estimates a transmit vector by demodulating the receive vector fed from the channel estimator 200 according to a certain MIMO detection scheme. The MIMO detector 202 outputs an LLR corresponding to the interference signal among LLRs constituting the transmit vector to the first decoder 204, and outputs an LLR corresponding to the desired signal to the second decoder 208. The MIMO detection scheme can include an MMSE scheme, an ML scheme, and so forth. The MIMO detection scheme is not limited to a specific scheme, and it is assumed that the MMSE scheme is adopted. Using the MMSE scheme, the MIMO detector 202 can estimate the transmit vector using Equation 2.

$$x\hat{x} = (H^H H + \sigma^2 I)^{-1} H^H y \quad [\text{Eqn. 2}]$$

In Equation 2, x is a transmit vector, H is a channel matrix, $\sigma^2$ is a noise power, I is an identity matrix, y is a receive vector, and the superscript H is a Hermitian transpose.

The first decoder 204 outputs soft decision values by iteratively decoding the estimated interference signal x, output from the MIMO detector 202. In doing so, the first decoder 204 examines whether there is a bit of the inverted sign during the iterative decoding. Detecting the bit (LLR value) of the inverted sign, the first decoder 204 provides the LLR of the detected bit to the LLR updater 212.

The LLR updater 212 updates the LLR value of the second decoder 208 with the LLR value output from the first decoder 204 and provides the updated LLR value to the second decoder 208. Herein, the LLR can be updated in various manner based on the MIMO detection scheme. For example, using the MMSE scheme, the LLR value can be updated using Equation 3:

$$x_2 = h_2^H((h_2 h_2^H + h_1(1-\hat{x}_1 \hat{x}_1)h_1^H + \sigma^2 I)^{-1})^H (y - h_1 \hat{x}_1) \quad [\text{Eqn. 3}]$$

In Equation 3, $\hat{x}_1$ is an LLR value generated in the process of the iterative decoding of the first decoder 204. Equation 3 can be simplified as Equation 4.

$$\begin{aligned} x_2 &\approx h_2^H \left((h_2 \eta_2^H + \sigma^2 I)^{-1}\right)^H (y - h_1 \hat{x}_1) \\ &= (\eta_2^H \eta_2 + \sigma^2)^{-1} h_2^H (y - h_1 \hat{x}_1) \end{aligned} \quad [\text{Eqn. 4}]$$

Concurrently with the first decoder 204, the second decoder 208 outputs soft decision values by iteratively decoding the estimated desired signal $\hat{x}_2$ output from the MIMO detector 202. When the LLR is updated by the LLR updater 212 in the process of the iterative decoding, the second decoder 208 continues the iterative decoding with the updated LLR value.

The first hard decision part 206 outputs decoded data $\tilde{x}_1$ by hard-deciding the soft decision values acquired through the iterative decoding of the first decoder 204. The second hard decision part 210 outputs decoded data $\tilde{x}_2$ by hard-deciding the soft decision values acquired through the iterative decoding of the second decoder 208.

In this embodiment of the present invention, the signal is detected by regarding one of two received signals as the interference.

To detect all of the two signals as in the MUD or the SM, the LLR updater 212 can update the internal LLR value of the second decoder 208 using the internal LLR value of the first decoder 204 and update the internal LLR value of the first decoder 204 using the internal LLR value of the second decoder 208.

As such, two signals can be decoded at the same time using a Parallel Interference Cancellation (PIC) scheme. If there are two or more signals to be decoded using the PIC scheme, Equation 3 can be generalized as Equation 5:

$$x_k = h_k^H((h_k h_k^H + H_k(1 - \text{diag}(\hat{x}_k \hat{x}_k^H))H_k^H + \sigma^2 I)^{-1})^H (y - H_k \hat{x}_k) \quad [\text{Eqn. 5}]$$

In Equation 5, $H_k = [h_1 \ldots h_{k-1} \, h_{k+1} \ldots h_{N_T}]$ indicates a matrix excluding $h_k$ and $\hat{x}_k = [\hat{x}_1 \ldots \hat{x}_{k-1} \, \hat{x}_{k+1} \ldots \hat{x}_{N_T}]^T$ indicates an interference signal vector constituted with LLR values excluding $\hat{x}_k$. Equation 5 can be simplified as Equation 6:

$$x_k = (h_k^H h_k + \sigma^2)^{-1} h_k^H (y - H_k \hat{x}_k) \quad [\text{Eqn. 6}]$$

FIG. 3 illustrates operations of the receiver to perform a Serial Interference Cancellation (SIC) according to an embodiment of the present invention. To facilitate understanding, the signal is detected by regarding one of the two received signals as the interference.

In step 301, the receiver constructs the receive vector y using the signals received on the plurality of antennas and constructs the channel matrix H.

In step 303, the receiver generates soft decision values (LLR values) by demodulating the receive vector according to a certain MIMO detection scheme. The MIMO detection scheme can adopt the MMSE scheme, the ML scheme, and so forth. For example, using the MMSE scheme, the receiver estimates the desired signal and the interference signal based on Equation 2.

After the MIMO detection, the receiver iteratively decodes the estimated desired signal and the estimated interference signal at the same time in step 305. After completing one iterative decoding, the receiver checks whether there is a bit of the inverted sign in the bits (LLR values) of the interference signal by comparing with the result prior to the iterative decoding in step 307. When there is no LLR of the inverted signal, the receiver checks whether the iterative decoding is performed by a preset number of times in step 313.

When there is the LLR of the inverted signal, the receiver calculates the LLR value of the desired signal corresponding to the sign-inverted LLR in step 309. For example, using the MMSE detection scheme, the receiver calculates the LLR value of the desired signal based on Equation 3 or 4. In step 311, the receiver updates the corresponding LLR value of the desired signal being iteratively decoded with the calculated value.

After updating the LLR value of the desired signal with the LLR value of the interference signal, the receiver examines whether the iterative decoding is performed by the preset number of times in step 313. When the number of times of the iterative decoding does not reach the preset number of times, the receiver returns to step 305 to perform the next iterative decoding. When the number of times of the iterative decoding reaches the preset number of times, the receiver acquires the information bit stream by hard-deciding the LLR values of the desired signal acquired through the iterative decoding in step 315.

FIG. 4 illustrates operations of a receiver to perform a Parallel Interference Cancellation (PIC) according to another embodiment of the present invention. To facilitate understanding, two received signals are detected at the same time.

In step 401, the receiver constructs the receive vector y using the signals received on the plurality of antennas, and constructs the channel matrix H.

In step 403, the receiver generates soft decision values (LLR values) by demodulating the receive vector according to a certain MIMO detection scheme. The MIMO detection scheme can adopt the MMSE scheme, the ML scheme, and so forth. For example, using the MMSE scheme, the receiver estimates the first signal and the second signal based on Equation 2.

After the MIMO detection, the receiver iteratively decodes the estimated first and second signals at the same time in step 405. After completing one iterative decoding, the receiver checks whether there is an LLR of the inverted signal in each of the first signal and the second signal by comparing with the result prior to the iterative decoding in step 407. There is no LLR of the inverted signal, the receiver checks whether the iterative decoding is performed by a preset number of times in step 413.

When there is the LLR of the inverted signal, the receiver calculates the LLR value of the other signal of the sign-inverted LLR in step 409. For example, using the MMSE detection scheme, the receiver can calculate the LLR value of the other signal based on Equation 3 or 4. In step 411, the receiver updates the corresponding LLR value of the other signal being iteratively decoded with the calculated value.

After updating the LLR value, the receiver examines whether the iterative decoding is performed by the preset number of times in step 413. When the number of times of the iterative decoding does not reach the preset number of times, the receiver returns to step 405 to perform the next iterative decoding. When the number of times of the iterative decoding reaches the preset number of times, the receiver acquires an information bit stream of the first signal by hard-deciding the LLR values of the first signal acquired through the iterative decoding in step 415. In step 417, the receiver acquires an information bit stream of the second signal by hard-deciding the LLR values of the second signal acquired through the iterative decoding.

As set forth above, the receiver, which cancels the interference using the decoding result, can reduce the latency using the decoding result. Since the SIC/PIC is applied in the process of the iterative decoding of the decoder, the latency can be eliminated by applying the SIC/PIC after the completion of the decoding. In addition, the decoding performance can be enhanced by updating the internal LLR value with the reliable value in the process of the decoding.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A receiving apparatus in a wireless communication system, comprising:
 a multiple-input, multiple-output (MIMO) detector configured to estimate a desired signal and an interference signal based on received signals in accordance with a MIMO detection scheme;
 a first decoder configured to iteratively decode the interference signal output from the detector;
 a second decoder configured to iteratively decode the desired signal output from the detector; and
 a log likelihood ratio (LLR) updater configured to update an internal LLR value of the second decoder using an internal LLR value of the first decoder,
 wherein the first decoder is further configured to detect a sign-inverted log likelihood ratio and to provide the sign-inverted log likelihood ratio to the LLR updater.

2. The receiving apparatus of claim 1, wherein the LLR updater is further configured to update the internal LLR value of the second decoder based on the following equation:

$$x_2 \approx h_2^H\left((h_2 h_2^H + \sigma^2 I)^{-1}\right)^H (y - h_1 \hat{x}_1)$$
$$= (h_2^H h_2 + \sigma^2)^{-1} h_2^H (y - h_1 \hat{x}_1),$$

where $x_2$ is the internal LLR value of the second decoder, $\hat{x}_1$ is the internal LLR value of the first decoder, $h_1$ is a first channel vector, $h_2$ is a second channel vector, y is a receive vector, $\sigma^2$ is a noise power, I is an identity matrix, and a superscript H is a Hermitian transpose.

3. The receiving apparatus of claim 1, wherein the first decoder and the second decoder are configured to use turbo decoding or Low density parity check (LDPC) decoding.

4. The receiving apparatus of claim 1, further comprising:
 a hard decision part configured to generate an information bit stream by hard-deciding soft values output from the second decoder.

5. A receiving apparatus in a wireless communication system, comprising:
 a multiple-input, multiple-output (MIMO) detector configured to estimate at least two streams based on received signals in accordance with a MIMO detection scheme;
 decoders configured to iteratively decode the streams output from the detector and to detect a sign-inverted log likelihood ratio (LLR) during the iterative decoding; and
 an LLR updater configured to receive the sign-inverted LLR from a first decoder and to update internal LLR values of the decoders other than the first decoder based on the sign-inverted LLR received from the first decoder, wherein the LLR updater is configured to update the internal LLR values of the decoders other than the first decoder using an interference cancellation scheme.

6. The receiving apparatus of claim 5, wherein the LLR updater is configured to update an internal LLR value $x_k$ of a k-th decoder based on the following equation:

$$x_k = (h_k^H h_k + \sigma^2)^{-1} h_k^H (y - H_k \hat{x}_k),$$

where $h_k$ is a channel vector, $H_k = [h_1 \ldots h_{k-1} h_{k+1} \ldots h_{N_T}]$ indicates a matrix excluding $h_k$, $\hat{x}_k = [\hat{x}_1 \ldots \hat{x}_{k-1} \hat{x}_{k+1} \ldots \hat{x}_{N_T}]^T$ indicates a vector constituted with LLR values excluding $\hat{x}_k$, y is a receive vector, $\sigma^2$ is a noise power, I is an identity matrix, and a superscript H is a Hermitian transpose.

7. The receiving apparatus of claim 5, wherein the decoders are configured to use turbo decoding or low density parity check (LDPC) decoding.

8. The receiving apparatus of claim 5, further comprising:
 hard decision parts configured to generate an information bit stream for the streams by hard-deciding soft values output from the decoders.

9. A receiving method in a wireless communication system, comprising:
 estimating a desired signal and an interference signal based on received signals in accordance with a multiple-input, multiple-output detection scheme;
 iteratively decoding each of the interference signal and the desired signal;
 detecting a sign-inverted log likelihood ratio while iteratively decoding the interference signal; and
 updating a log likelihood ratio (LLR) value generated during the iterative decoding of the desired signal using an LLR value generated during the iterative decoding of the interference signal, wherein updating the LLR value comprises updating the LLR value of the desired signal using the sign-inverted log likelihood ratio.

10. The receiving method of claim 9, wherein the LLR value of the desired signal is updated based on the following equation:

$$x_2 \approx h_2^H\left((h_2 h_2^H + \sigma^2 I)^{-1}\right)^H (y - h_1 \hat{x}_1)$$
$$= (h_2^H h_2 + \sigma^2)^{-1} h_2^H (y - h_1 \hat{x}_1),$$

where $x_2$ is a LLR value of the desired signal, $\hat{x}_1$ is a LLR value of the interference signal, $h_1$ is a first channel vector, $h_2$ is a second channel vector, y is a receive vector, $\sigma^2$ is a noise power, I is an identity matrix, and a superscript H is a Hermitian transpose.

11. The receiving method of claim 9, wherein the iterative decoding uses turbo decoding or low density parity check (LDPC) decoding.

12. The receiving method of claim 9, further comprising:
generating an information bit stream by hard-deciding soft values which are results of the iterative decoding of the desired signal.

13. A receiving method in a wireless communication system, comprising:
estimating at least two streams based on received signals in accordance with a multiple-input, multiple-output detection scheme;
iteratively decoding each of the streams;
detecting a sign-inverted log likelihood ratio during the iterative decoding of the streams; and
updating, when the sign-inverted log likelihood ratio is detected during the iterative decoding of a first stream, a corresponding log likelihood ratio (LLR) of the streams other than the first stream being iteratively decoded, wherein updating comprises updating the corresponding LLR of the streams other than the first stream using an interference cancellation scheme.

14. The receiving method of claim 13, wherein updating comprises updating the corresponding LLR value $x_k$ of a k-th stream based on the following equation:

$$x_k = (h_k^H h_k + \sigma^2)^{-1} h_k^H (y - H_k \hat{x}_k),$$

where $h_k$ is a channel vector, $H_k = [h_1 \ldots h_{k-1} \ h_{k+1} \ldots h_{N_T}]$ indicates a matrix excluding $h_k$, $\hat{x}_k = [\hat{x}_1 \ldots \hat{x}_{k-1} \ \hat{x}_{k+1} \ldots \hat{x}_{N_T}]^T$ indicates a vector constituted with LLR values excluding $\hat{x}_k$, y is a receive vector, $\sigma^2$ is a noise power, I is an identity matrix, and a superscript H is a Hermitian transpose.

15. The receiving method of claim 13, wherein the iterative decoding uses turbo decoding or low density parity check (LDPC) decoding.

16. The receiving method of claim 13, further comprising:
generating an information bit stream for each of the streams by hard-deciding soft values which are the results of the iterative decoding.

* * * * *